United States Patent [19]

Fitzner

[11] 4,306,535

[45] Dec. 22, 1981

[54] HIGH SPEED SPARK ADVANCER FOR AN INTERNAL COMBUSTION ENGINE IGNITION SYSTEM

[75] Inventor: Arthur O. Fitzner, Fond du Lac, Wis.

[73] Assignee: Brunswick Corporation, Skokie, Ill.

[21] Appl. No.: 117,666

[22] Filed: Feb. 1, 1980

[51] Int. Cl.³ .............................................. F02P 5/04
[52] U.S. Cl. ..................................... 123/602; 123/415
[58] Field of Search ............... 123/414, 415, 416, 418, 123/602, 417, 424

[56] References Cited

U.S. PATENT DOCUMENTS

| | | | |
|---|---|---|---|
| 3,874,349 | 4/1975 | Fitzner | 123/602 |
| 3,898,972 | 8/1975 | Haubner | 123/602 |
| 3,923,022 | 12/1975 | Scholl | 123/415 |
| 4,015,564 | 4/1977 | Fitzner | 123/602 |
| 4,111,174 | 9/1978 | Fitzner et al. | 123/602 |
| 4,208,992 | 6/1980 | Polo | 123/41 J |
| 4,244,336 | 1/1981 | Fitzner | 123/602 |

Primary Examiner—Raymond A. Nelli
Attorney, Agent, or Firm—Andrus, Sceales, Starke & Sawall

[57] ABSTRACT

A speed sensor (90) of a high speed spark advancer (80) responds to the input voltage pulse on the primary winding (92) of a spark inducing ignition transformer (92a) to provide a single speed responsive pulse (115) during each complete operating cycle of an alternator driven ignition system (81). A speed switch (94) responds to each speed responsive pulse (115) to selectively transfer between a first condition when the engine (83) operates within a predetermined high speed range and a second condition when the engine (83) operates below the predetermined high speed range. A spark advance control (95) responds to the first condition to provide a modifying input to the ignition system (81) to provide a high speed advanced spark angle (168) and responds to the second condition to vary the modifying input to provide a second spark angle (169). The high speed spark advancer (80) provides a rapid transition (170) from the high speed advanced spark angle to the second spark angle to reduce the likelihood of detonation within the engine (83).

5 Claims, 7 Drawing Figures

HIGH SPEED SPARK ADVANCER FOR AN INTERNAL COMBUSTION ENGINE IGNITION SYSTEM

CROSS REFERENCE TO RELATED APPLICATIONS

A portion of the apparatus and methods disclosed in this application are disclosed and/or claimed in the following concurrently filed applications:

Ser. No. 06/117,668, filed Feb. 1, 1980 in the name of Arthur O. Fitzner and entitled "Pulse Controlled Spark Advance Unit For An Internal Combustion Engine Ignition System".

Ser. No. 06/117,667, filed Feb. 1, 1980 in the name of Arthur O. Fitzner and entitled "External Pulse Controlled Spark Advance Unit For An Internal Combustion Engine Ignition System".

TECHNICAL FIELD

The invention relates to a spark advancer for an ignition system connected to operate an internal combustion engine.

BACKGROUND ART

One automatic spark timing advance system senses engine speed, such as by monitoring either the negative bias voltage applied to bias controlled rectifier circuitry used to control the spark angle or the high speed alternator winding output for operating an auxiliary controlled rectifier to conduct opposite polarity pulses from the alternator to trigger the controlled rectifier circuitry to provide an advanced spark angle at higher speeds, such as provided in the application by Arthur O. Fitzner and entitled "Ignition System for Multiple Cylinder Internal Combustion Engines Having Automatic Spark Advance", which issued on Apr. 1, 1975 to U.S. Pat. No. 3,874,349 and is assigned to a common assignee herewith.

The U.S. Pat. No. 3,898,894, which issued on Aug. 12, 1975 and is entitled "Engine Ignition Timing Control", discloses a system for controlling ignition spark timing by modulating the pulse width of a pulse signal to provide ignition timing throughout the varying operating conditions of the engine.

Another system employs a "bucket" type tachometer circuit connected to a pilot trigger capacitor to receive a pulse rate related charging signal to operate a field-effect transistor operating to vary the resistance at a timing stabilizing threshold bias capacitor to reduce the bias voltage for lowering the triggering threshold to automatically advance the spark at idle speeds, such as provided in the application by Arthur O. Fitzner and entitled "Ignition System with Idle Speed Governor Apparatus", which issued on Jan. 4, 1977 to U.S. Pat. No. 4,111,174 and is assigned to a common assignee herewith.

Another prior spark timing advance senses a plurality of pulses provided by the alternator high speed winding during each cycle of the ignition system operation to vary the negative bias voltage which biases the controlled rectifier circuitry to provide an advanced spark angle limited to low speeds, and wherein the high speed winding is lightly loaded and provides essentially undistorted signals at such low speeds, as provided in the application by Arthur O. Fitzner and entitled "Low Speed Limiter Unit for Internal Combustion Engine Ignition Systems", which issued on Jan. 13, 1981 to U.S. Pat. No. 4,244,336 and assigned to a common assignee herewith.

DISCLOSURE OF INVENTION

An improved spark advancer for an ignition system employs a speed sensor connected to respond to only a single pulse during each operating cycle of the ignition system. A transfer circuit responds to the pulse when the engine operates within a predetermined high speed range to provide a modifying input to the ignition system for providing an advanced spark angle within the predetermined high speed range. Within the high speed range, the power output is substantially increased by the advanced spark angle without danger of detonation. With reducing speed, a rapid transition from the high speed advanced spark angle to a second spark angle occurs to reduce the likelihood of detonation within the engine.

BEST MODE FOR CARRYING OUT THE INVENTION

Figure 2:
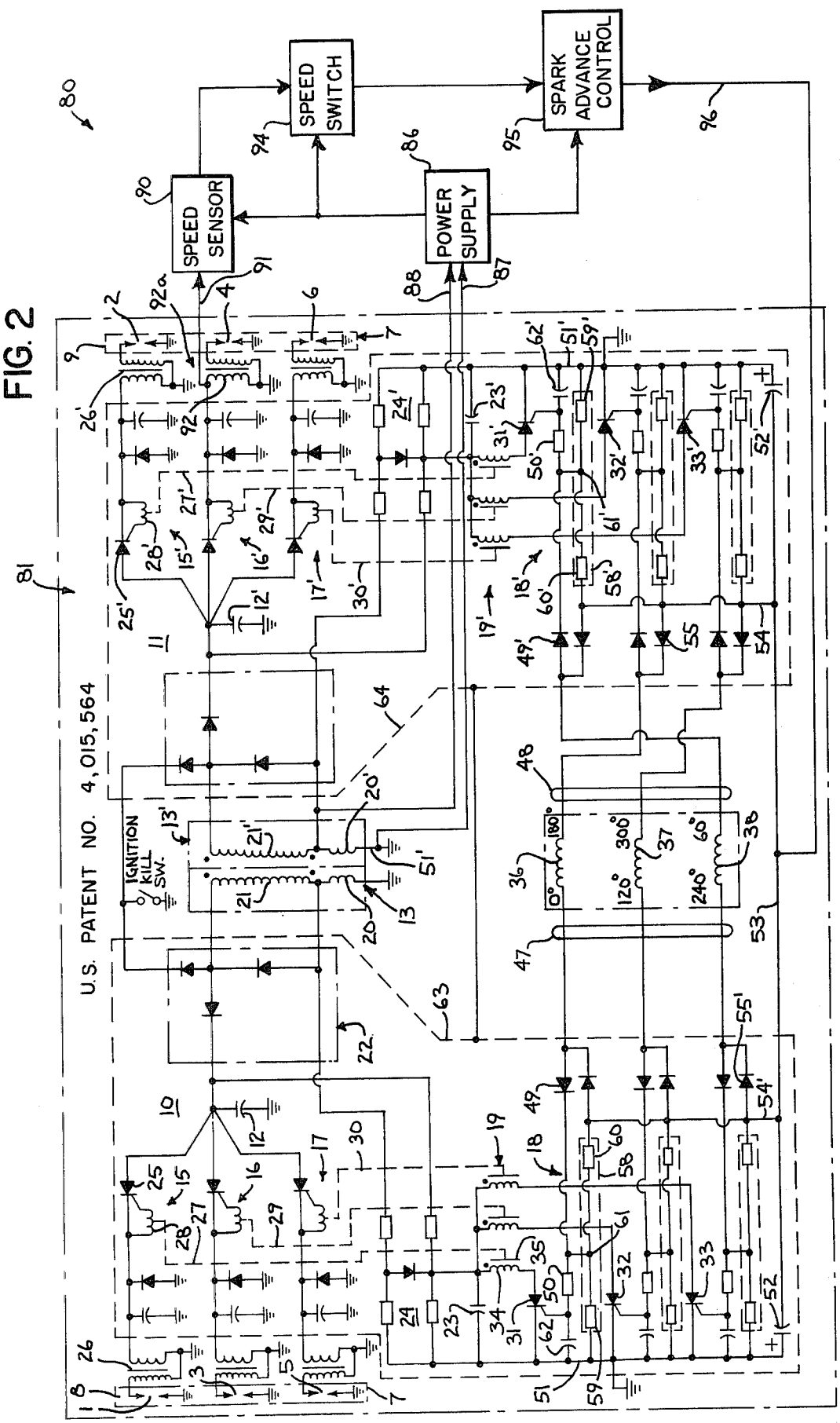
FIG. 2 is a block diagram illustrating a high speed spark advancer and a schematic circuit showing one type of an alternator driven ignition system for a six cylinder, two cycle high horsepower outboard motor.

A high speed spark advancer 80 is connected to an alternator-driven ignition system 81 connected to supply ignition pulses to a series of combustion chambers 82 provided by an internal combustion engine 83 operating as a boat motor 84. A flywheel type alternator 85 of motor 84 is driven by the engine crankshaft and generates an output providing both energizing power and timing signals to the ignition system 81. The ignition system 81 may comprise any one of a number of different types of ignition systems. The capacitive discharge ignition system 81 illustrated in FIG. 2 is more fully shown and described in U.S. Pat. No. 4,015,564 issued on Apr. 4, 1977, and assigned to a common assignee herewith. The various components of ignition system 81 are numbered in accordance with the numbering system provided in U.S. Pat. No. 4,015,564.

Figure 4:
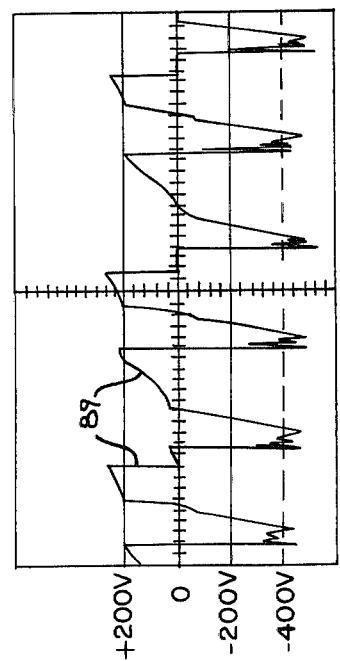
FIG. 4 is a graphical illustration of a series of pulses provided by a high speed winding of an alternator during each cycle of operation of the ignition system illustrated in FIG. 2.

The high speed spark advancer 80 includes a power supply 86 having an input circuit 87 connected to the system neutral circuit 51' and an input circuit 88 connected to the high speed alternator winding 20'. The alternator 85 is constructed to provide six complete alternations 89 from the high speed winding 20' for each cycle (i.e. full revolution) of motor operation as illustrated in FIG. 4. The power supply 86 responds to the plurality of alternations 89 to provide operating power to the various circuits of the high speed spark advancer 80.

Figure 5:
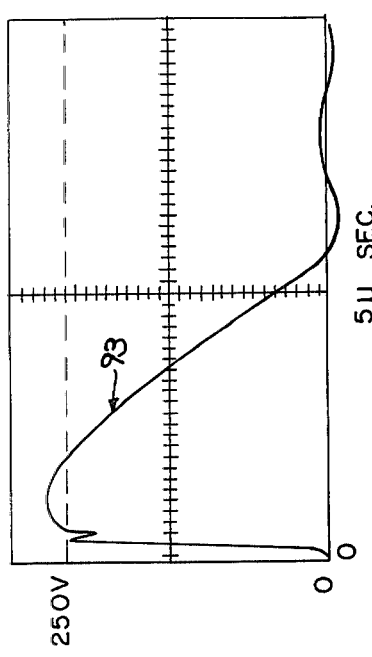
FIG. 5 is a graphical illustration of a pulse provided during each cycle of operation by a discharge circuit to provide a spark in the ignition system illustrated in FIG. 2.

A speed sensor 90 provides an input circuit 91 connected to a primary winding 92 of an output transformer 92a. As more fully described in U.S. Pat. No. 4,015,564, the discharge circuit 16' is selectively energized to discharge capacitor 12' to energize the primary winding 92 of transformer 92a. In such manner, the spark plug 4 is energized through the secondary winding of transformer 92a to provide combustion within the associated combustion chamber 82 to provide a power output to drive a boat propeller or the like. Selective discharge of capacitor 12' by the discharge circuit 16' produces an energizing pulse 93 for the primary winding 92 as illustrated in FIG. 5. In that speed sensor 90 monitors only one of the six discharge circuits provided by ignition system 81, only one pulse 93 will be sensed by speed sensor 90 for each cycle of operation of the ignition system 81.

A speed switch 94 responds to the output of speed sensor 90 to provide a speed responsive output to control the operation of a spark advance control 95. Under certain prescribed conditions, as more fully set forth hereinafter, the spark advance control 95 selectively varies the reverse bias voltage maintained at the biasing capacitors 52 and 52' through the connecting circuit 96 to thereby change the ignition angle for all six of the ignition discharge circuits.

Figures 1, 3:
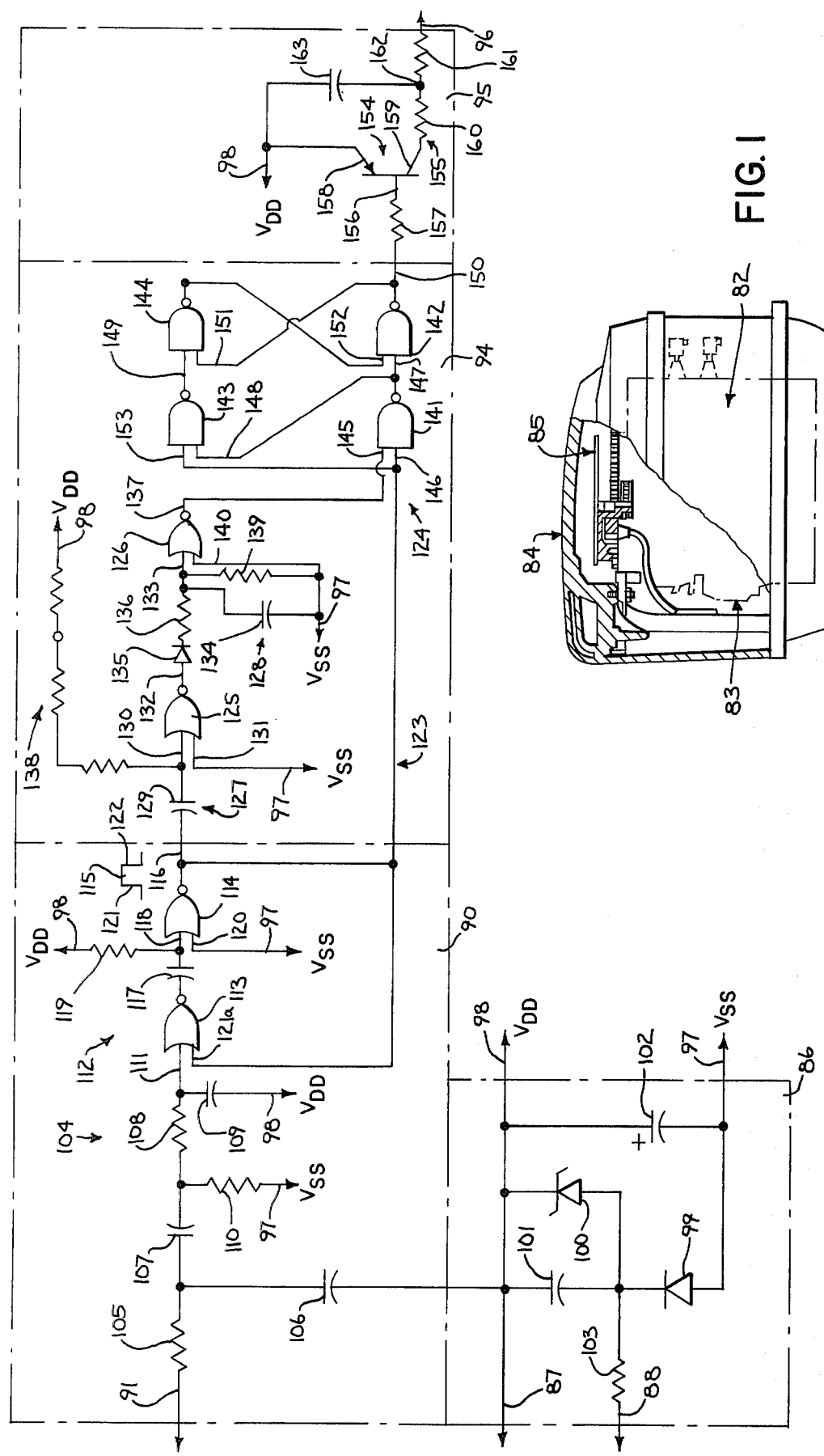
FIG. 1 is a simplified view of an outboard motor for a boat with parts broken away to generally show inner details of construction.
FIG. 3 is a circuit schematic showing the high speed spark advancer of FIG. 2.

With reference to FIG. 3, the alternations 89 supplied through connecting circuit 88 to power supply 86 are rectified and stabilized to provide a negative, substantially constant reference voltage $V_{SS}$ at a connecting circuit 97. The power supply 86 also provides a connecting circuit 98 joined to the system neutral circuit 87 to supply a system neutral reference voltage $V_{DD}$. For logic circuit purposes, the voltage level $V_{SS}$ shall be regarded as logic "0", while the voltage level $V_{DD}$ shall be regarded as logic "1".

The conversion of the cyclic alternations 89 into stabilized DC voltages capable of powering standard logic components is provided by a rectifying diode 99, a Zener diode 100, a pair of stabilizing capacitors 101 and 102, and an input resistor 103. The plurality of alternations 89 occurring every engine operating cycle are sufficient to maintain a substantially constant voltage across capacitor 102.

The first portion of speed sensor 90 comprises a noise filtering, level shifting, waveform adjusting circuit 104 to provide signals on an output line 111 compatible with the input signal handling capabilities of a pulse generator 112. Noise filtering is provided by an input resistor 105 and capacitor 106, which filter high frequency transients at the input circuit 91 to the system neutral 98. Level shifting is accomplished by capacitively coupling the noise-filtered signal via capacitor 107 to load resistor 110, where the other end of resistor 110 is connected to the $V_{SS}$ supply line 97. The level-shifted signal is thus effectively referenced to the logic "0" level. Waveform adjusting and some additional noise filtering is accomplished by resistor 108 and capacitor 109, resulting in a much lower amplitude, slower rising, broader signal pulse on line 111 than the original input signal pulse 93 on input circuit 91. The reduced amplitude, broad pulse on line 111 is supplied as the signal input to pulse generator 112.

Within the pulse generator 112, a pair of NOR logic circuits 113 and 114 are interconnected in closed loop configuration to provide a narrow rectangular pulse, such as illustrated by waveform 115, at an output circuit 116 in response to each broad pulse appearing at input circuit 111. The NORs 113 and 114 may comprise standard CMOS gates provided by any one of a number of commercially available sources, such as by RCA under the designation CD 4001 BE, for example. The specific circuitry of pulse generator 112 is set forth in RCA Application Note ICAN-6267.

In any event, NOR 113 responds to logic "0" signals at both inputs, in the absence of an input pulse 93, to provide a logic "1" signal to a capacitor 117. The capacitor 117 is connected to an input 118 of NOR 114 and to the system neutral circuit 98 through a resistor 119. An input 120 of NOR 114 is connected to the logic "0" circuit 97. In the absence of pulse 94, input 118 is at logic "1" and NOR 114 provides a logic "0" signal to output circuit 116 and to an input 121a of NOR 113. The occurrence of pulse 93 provides a momentary logic "1" signal to input 111. NOR 113 responds to the momentary logic "1" input to provide a logic "0" signal to capacitor 117. NOR 114 responds to the logic "0" signal coupled via capacitor 117 to input 118 to provide a logic "1" signal at output 116. As the capacitor 117 discharges to a magnitude corresponding to a logic "1" level, NOR 114 responds to provide a logic "0" signal at output 116. In such manner, the narrow rectangular pulse 115 having a sharp transition in both a leading edge 121 and a trailing edge 122 is provided for each pulse 93.

The speed switch 94 includes a retriggerable timer 123 and a gated latch 124. The timer 123 includes NOR logic circuits 125 and 126 functioning with a pair of timing circuits 127 and 128 to provide a compensated monostable multivibrator type of circuit, which is similar to the type disclosed in RCA Application Note ICAN-6267. The NORs 125 and 126 may be selected from any one of a number of commercially available CMOS gates, such as marketed by RCA under the designation CD 4001 BE.

The retriggerable timer 123 is triggered by the trailing edge 122 of pulse 115 to provide a timing period. Actually, the sequence starts even earlier with the appearance of pulse 115, which rapidly discharges timing capacitor 129 through one of the input protective diodes contained internally in NOR 125. The occurrence of the trailing edge 122 of pulse 115 is automatically coupled via discharged capacitor 129 to input 130 as a logic "0" signal, following which the signal on input 130 slowly starts rising toward the logic "1" level as capacitor 129 is slowly recharged by current supplied from line 98 through timing resistance 138. With the signal on input 130 in the logic "0" range and rising, and with the signal on the other input 131 maintained at logic "0", NOR 125 responds by supplying a logic "1" signal on output 132. Such logic "1" signal at output 132 is supplied to an input 133 of NOR 126 and to a timing capacitor 134 through a serially connected diode 135 and resistor 136. The timing capacitor 134 rapidly charges to full voltage and NOR 126 responds to the logic "1" signal at input 133 to provide a logic "0" signal to the gated latch 124 through an output circuit 137.

The NOR 125 maintains the logic "1" signal at output 132 while the capacitor 129 partially recharges during a first predetermined time through a resistive circuit 138 to the system neutral circuit 98. After the first predetermined time following the trailing edge 122 of a pulse 115, the capacitor 129 becomes sufficiently recharged to provide a logic "1" at input 130 and NOR 125 transfers to provide a logic "0" at output 132. The second timing capacitor 134, however, maintains a logic "1" at input 133 for a second predetermined time to maintain the logic "0" signal at output 137. If another negative going or trailing edge 122 of a subsequent pulse 115 is not developed at output 116 prior to the expiration of the second predetermined time period, the capacitor 134 becomes discharged sufficiently through a timing resistor 139 to the logic "0" circuit 97 to provide a logic "0" at input 133 of NOR 126. The other input 140 of NOR 126 is maintained at a logic "0" by connection to the circuit 97. Thus with both inputs 133 and 140 at a logic "0", the NOR 126 transfers to provide a logic "1" signal to the gated latch 124 through the output circuit 137.

When operating at a predetermined speed within a predetermined high speed range, such as at 5500 RPM for example, fifty-five hundred of pulses 115 will occur during each minute. At such high speed, the trailing edges 122 of succeeding pulses 115 occur within the sum of the first and second time periods provided by the timing circuits 127 and 128. Thus when operating at a predetermined speed within the high speed range, the NOR 126 maintains a logic "0" signal at output 137 indicating a high speed operation.

When engine 83 is operating at a speed below the predetermined high speed range, the timing circuits 127 and 128 time out within the time period between the trailing edges 122 of succeeding pulses 115. The NOR 126 thus transfers to provide a logic "1" signal indicating engine operation below the predetermined high speed range.

The gated latch 124 includes four NAND logic circuits 141, 142, 143 and 144 interconnected in a flip-flop configuration. The NAND logic circuits 141-144 may be selected from any one of a number of commercially available CMOS gates, such as marketed by RCA under the designation CD4011BE.

The latch 124 provides a memory which is updated periodically in response to the pulses 115. If the engine 83 is operating at a speed below the predetermined high speed range, the retriggerable timer 123 provides a logic "1" signal to an input 145 of NAND 141. An input 146 of NAND 141 is connected to the output circuit 116 provided by the speed sensor 90. Thus when pulse 115 occurs, a logic "1" signal appears at input 146 of NAND 141 and at an input 153 of a NAND 143 to gate the latch 124. With a logic "1" signal at input 145 indicating an operating speed below the predetermined high speed range, the gating logic "1" signal provided by pulse 115 at inputs 146 and 153 updates the status of latch 124. Thus with logic "1" signals at both inputs 145 and 146, NAND 141 provides a logic "0" signal to an input 147 of NAND 142 and to an input 148 of NAND 143. The NAND 143 responds to the logic "0" at input 148 to provide a logic "1" at an input 149 of NAND 144. The NAND 142 responds to the logic "0" at input 147 to provide a logic "1" signal at an output circuit 150 which is connected to an input 151 of NAND 144. With logic "1" signals at both of its inputs 149 and 151, NAND 144 provides a logic "0" signal to an input 152 of NAND 142 to maintain the logic "1" signal at output 150 indicating that the engine 83 is operating at a speed below the predetermined high speed range. When pulse 115 returns to logic "0", NAND 141 transfers and provides a logic "1" signal on input 147 of NAND 142, while NAND 143 merely continues to provide a logic "1" signal on input 149 of NAND 144. Since no new logic "0" inputs are introduced to cross-coupled NANDs 142 and 144, the NANDs 142 and 144 merely hold in their respective states, and thereby continue to indicate that the engine 83 is operating at a speed below the predetermined high speed range.

If the engine 83 is operating at a speed within the predetermined high speed range, the retriggerable timer 123 provides a logic "0" signal to the input 145 of NAND 141. The occurrence of the next pulse 115 gates the latch 124 to update its memory state. With a logic "0" signal at input 145 indicating an operation within the high speed range, the gating pulse 115 at input 146 causes NAND 141 to provide a logic "1" signal to input 147 of NAND 142 and to input 148 of NAND 143. The gating pulse 115 is also provided to input 153 of NAND 143. With logic "1" signals at both inputs 148 and 153, NAND 143 transfers state to provide a logic "0" signal to input 149 of NAND 144. NAND 144, in turn, responds to the logic "0" signal at input 149 to provide a logic "1" signal to input 152 of NAND 142. With logic "1" signals at both of the inputs 147 and 152, NAND 142 changes state to provide a logic "0" signal at output 150 indicating that the engine 83 is operating within the predetermined high speed range. When pulse 115 returns to the logic "0" level, NAND 143 transfers and provides a logic "1" signal to input 149 of NAND 144, while NAND 141 merely continues to provide a logic "1" signal to input 147 of NAND 142. Since no new logic "0" signals are introduced to cross-coupled NANDs 142 and 144, the NANDs 142 and 144 merely hold in their respective states, and thereby continue to indicate that the engine 83 is operating at a speed within the predetermined high speed range.

The spark advance control 95 includes a switch 154 and a bias voltage modifying impedance 155 comprised of resistors 160 and 161 in series. The switch 154 includes a PNP type transistor providing a base circuit 156 connected to the output 150 of the speed switch 94 through a connecting resistor 157. An emitter circuit 158 of transistor 154 is connected to the system neutral circuit 98 while a collector circuit 159 is connected to the output circuit 96 through a pair of serially connected resistors 160 and 161. A junction 162 between resistors 160 and 161 is connected to the system neutral circuit 98 through a capacitor 163 to protect the transistor 154 from high voltage, high frequency transients.

The spark advance control 95 responds to an operating speed below the predetermined high speed range to operatively disable the high speed spark advancer 80 from providing any operative influence upon the ignition system 81. Specifically, a logic "1" signal provided by speed switch 94 at output 150, which indicates an engine speed below the predetermined high speed range, is applied to base circuit 156 to render the transistor 154 turned off, i.e. non-conductive. In such manner, the modifying impedance 155 is operatively disconnected so as not to provide any operative influence on the reverse-bias voltage provided by the capacitors 52 and 52' within the ignition system 81.

On the other hand, the spark advance 95 responds to an operating speed within the predetermined high speed range to condition the ignition system 81 to provide a significant spark advance. In this regard, a logic "0" signal provided by speed switch 94 at output 150, which indicates an engine operation within the predetermined high speed range, is applied to the circuit 156 to render the transistor 154 turned on, i.e. conductive. In such manner, the modifying impedance 155 is operatively connected to provide a modifying influence upon the reverse-bias voltage retained by capacitors 52 and 52′ within the ignition system 81. Thus, an additional circuit connection is completed from the system neutral circuit 98, conducting transistor 154, resistors 160 and 161, and connecting circuit 96 to the negative bias circuit 53 of ignition system 81. With transistor 154 conductive, the reverse bias voltage at circuit 53 is significantly reduced, such as by fifty percent for example, to provide a significant advance in the spark angle.

Figure 6:
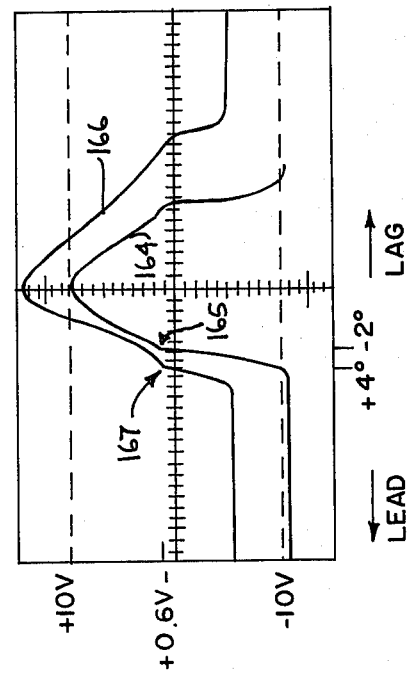
FIG. 6 is a graphical illustration of gating signals employed to actuate a controlled rectifier to provide an ignition spark and having an ordinate representing voltage and an abscissa representing the ignition angle.

At operating speeds below the predetermined high speed range, a gating signal 164 as illustrated in FIG. 6 appears sequentially at the inputs of the resistors connected to the gate terminals of the control rectifiers. The gating signal 164 constitutes a summation of the gating pulse, such as provided by the alternator winding 36 and directed toward the control rectifier 32′ for example, and the reverse bias voltage provided by the biasing capacitors 52 and 52′. When a predetermined forward voltage drop across the gate to cathode circuit of a control rectifier occurs, such as 0.6 volts for example, gate current will begin to flow, and that control rectifier is rendered conductive. Such conduction is illustrated in FIG. 6 as occurring at point 165 corresponding to a relative ignition firing angle of approximately two degrees lag (−2°). The ignition at point 165 of the gating signal 164 occurs without any influence by the high speed spark advancer 80 and is referred to as a normal firing angle.

When speed sensor 90 senses an operating speed within the predetermined high speed range, such as above 5500 RPM for example, the speed switch 94 activates the spark advance control 95 to operatively connect the resistors 160 and 161 to modify the potential at the reverse bias capacitors 52 and 52′. In such sequence, a modified gating signal 166 appears sequentially at the inputs of the resistors connected to the gate terminals of the control rectifiers. When the voltage of gating signal 166 reaches a predetermined magnitude, such as 0.6 volts for example, the affected control rectifier is rendered conductive. Such conduction is illustrated in FIG. 6 at point 167 corresponding to a relative ignition firing angle of approximately four degrees lead (+4°) which, based on the previous two degrees lag (−2°), constitutes a significant advance in the spark angle for the ignition system 81.

Figure 7:
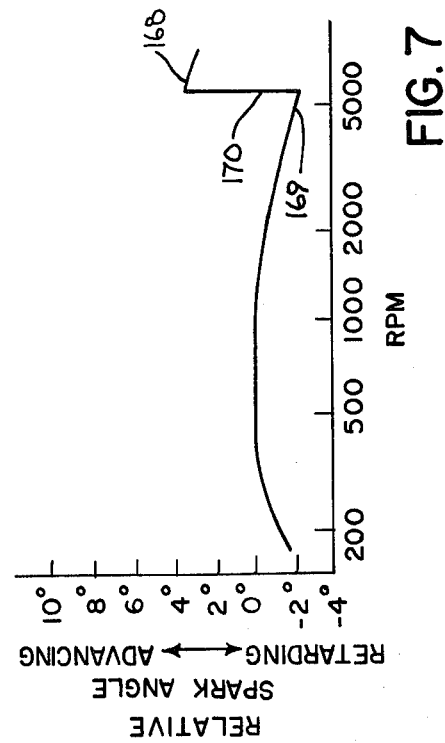
FIG. 7 is a graphical illustration of an electronic timing characteristic having an ordinate showing the ignition angle and an abscissa showing the engine speed in revolutions per minute (RPM).

Though not illustrated, a mechanical spark advance is also used on the engine 83 to rotate the alternator windings 36, 37 and 38 to advance and retard the spark in response to changing engine operating conditions. This mechanical spark advance is in addition to the spark advance produced by the electronic spark advance unit 80. FIG. 7 illustrates the general relationship between the firing or spark angle and engine speeds produced by the electronic spark advance unit 80. When engine 83 operates within the high speed range, such as at or above 5500 RPM for example, the spark advance control 95 is operative to significantly advance the spark angle as illustrated at 168. When engine 83 decreases its operating speed to a predetermined speed below the high speed range, the high speed spark advancer 80 disables its spark advance control 95 and the firing or spark angle returns to the normal position as illustrated at 169 in FIG. 7.

The transition between the advanced spark angle 168 for operation within the high speed range to the normal or customary spark angle 169 when the engine speed decreases below the high speed range is significantly rapid to provide a substantially instantaneous transition, as illustrated at 170 in FIG. 7. Thus when the operating speed of engine 83 decreases below the predetermined high speed range, a substantially instantaneous transition 170 occurs and the relative spark angle rapidly transfers from a relatively advanced spark angle, such as approximately four degrees lead for example, to a normal spark angle, such as a two degrees lag for example, in response to the operation of the high speed spark advance control 80. If the engine 83 is operating under an overload condition or if the power output at wide open throttle decreases such that the engine speed drops below the predetermined high speed range, the high speed spark advancer 80 rapidly restores the spark angle to the normal operating value, as illustrated at 169 in FIG. 7, to prevent the possibility of detonation.

The high speed spark advancer 80 operatively responds to only a single control pulse 93 for each operating cycle of engine 83. The use of only a single control pulse 93 provides an accurate and reliable transition 170. During high speed operations, the alternations 89 provided by the high speed winding 20′ become heavily and unevenly loaded by the normal operation of the ignition system 81, resulting in six (6) unevenly spaced alternations 89 during each cycle of operation. The response by the high speed spark advancer 80 to only a single pulse 93, such as provided by only one of a series of firing circuits, during each operating cycle of the ignition system 81 provides an accurate and reliable transition, as illustrated at 170, to disable the high speed spark advance when sensed engine speed decreases below the predetermined high speed range thereby preventing detonation.

I claim:

1. A high speed spark advancer for a solid state ignition system for a two-cycle engine, comprising:
   (A) speed sensing means connected to the ignition system to respond to only a single pulse during each operating cycle of the ignition system, and
   (B) transition means connected to said speed sensing means and to the ignition system and operable in response to a series of said single pulses between a first condition when the engine operates at and above a predetermined speed to provide a modifying input to the ignition system to provide a first spark angle and a second condition when the engine operates below said predetermined speed to vary said modifying input to provide a second spark angle substantially less advanced than said first spark angle with a substantial step type transfer from the first spark angle to the second spark angle to reduce the likelihood of detonation within the engine when changing from an operation at said predetermined speed to an operation below said predetermined speed.

2. The spark advancer of claim 1, wherein said speed sensing means includes an input circuit connected to a discharge circuit selectively actuated to supply said pulse to provide a spark.

3. The spark advancer of claim 2, wherein said transition means includes means responsive to the frequency of said pulses provided by said discharge circuit to selectively transfer between said first and second conditions.

4. The spark advancer of claim 1, wherein said transition means includes:
(1) circuit means for providing a signal modifying impedance and
(2) a selectively operable switch having a first condition to connect said impedance means to a reverse bias voltage source within the ignition system to provide a first reverse bias voltage signal to discharge circuit means to advance the gating angle thereof to provide said first spark angle and a second condition to operatively disconnect said impedance from the reverse bias voltage source to provide a second reverse bias voltage signal to the discharge circuit means to provide a second gating angle and said second spark angle.

5. An internal combustion engine having a combustion chamber cooperating with an ignition system to provide internal combustion to generate a mechanical output, said ignition system comprising:
(A) at least one first switch operatively connecting a first capacitive energy source to a chamber,
(B) at least one second switch operatively connecting a second capacitive energy source to actuate the first switch,
(C) an alternator operated by the mechanical output and connected to provide at least one timing signal to actuate the second switch at a first predetermined time when the timing signal exceeds a biasing signal provided by a biasing source to actuate the first switch to conduct energy from the first source to the chamber to provide a spark for ignition, and
(D) a high speed spark advancer connected to the engine to sense speed and to the biasing source to vary the biasing signal between a first biasing relationship to provide a first spark angle and a second biasing relationship to provide a second spark angle substantially less than the first angle,
said spark advancer including:
(1) speed sensing means connected to the ignition system to respond to only single pulse during each operating cycle of the engine,
(2) speed switch means connected to said speed sensing means and operable between a first condition when the engine operates at and above a predetermined speed and a second condition when the engine operates below said predetermined speed, and
(3) spark advance control means connected to said speed switch means and to the biasing source to selectively provide the first biasing relationship in response to said first condition to provide said first spark angle when operating at and above said predetermined speed and to provide the second biasing relationship in response to said second condition to provide the second spark angle and exhibiting a substantial step type transfer from the first spark angle to the second spark angle to reduce the likelihood of detonation within the combustion chamber.

* * * * *